US012716803B2

(12) United States Patent
Liebich

(10) Patent No.: US 12,716,803 B2
(45) Date of Patent: Aug. 25, 2026

(54) LEAK DETECTORS

(71) Applicant: INFICON GMBH, Cologne (DE)

(72) Inventor: Jörn Liebich, Cologne (DE)

(73) Assignee: INFICON GMBH, Cologne (DE)

( * ) Notice: Subject to any disclaimer, the term of this patent is extended or adjusted under 35 U.S.C. 154(b) by 294 days.

(21) Appl. No.: 18/565,471

(22) PCT Filed: May 31, 2022

(86) PCT No.: PCT/EP2022/064685
§ 371 (c)(1),
(2) Date: Nov. 29, 2023

(87) PCT Pub. No.: WO2022/263163
PCT Pub. Date: Dec. 22, 2022

(65) Prior Publication Data

US 2024/0264030 A1 Aug. 8, 2024

(30) Foreign Application Priority Data

Jun. 17, 2021 (DE) ..................... 10 2021 115 664.5

(51) Int. Cl.
*G01M 3/28* (2006.01)
*G01M 3/20* (2006.01)

(52) U.S. Cl.
CPC .......... *G01M 3/2876* (2013.01); *G01M 3/205* (2013.01)

(58) Field of Classification Search
CPC .................................................. G01M 3/2876
See application file for complete search history.

(56) References Cited

U.S. PATENT DOCUMENTS 5,703,281 A * 12/1997 Myneni .................. G01M 3/20 73/40.7
6,286,362 B1 * 9/2001 Coffman .............. G01M 3/202 73/40.7

(Continued)

FOREIGN PATENT DOCUMENTS

CN 112378595 A 2/2021
DE 3421533 A1 1/1985

(Continued)

*Primary Examiner* — Alexander A Mercado
(74) *Attorney, Agent, or Firm* — Dickinson Wright PLLC

(57) ABSTRACT

A leak detection device (10) comprising a gas detector (12), a vacuum pump (14), a port for a test object (22) and a gas conducting path connecting the port to the gas detector (12) and the vacuum pump (14), is characterized in that the port (16) comprises a controllable isolation valve (20) for the selective opening or closing of the port (16), and that a pressure measurement device (24) for measuring the pressure at the port (16) is provided and the connection line (18) comprises a controllable venting valve (V3, V3*a*) for selectively allowing gas from the surrounding atmosphere to flow to the port (16) in a pulse-like manner, wherein the leak detection device (10) is configured to measure the pressure p(t1) at the port (16) at a first time t1 before the opening of the venting valve, thereafter to open and close the venting valve in a pulse-like manner and to measure the pressure p(t2) at the port (16) at least at a time t2>t1 after the closing of the venting valve and to determine, whether the isolation valve (20) is open or closed based on the measured pressures p(t1), p(t2).

14 Claims, 1 Drawing Sheet

(56) References Cited

U.S. PATENT DOCUMENTS

| | | | | |
|---|---|---|---|---|
| 2017/0292894 | A1* | 10/2017 | Decker ................. | G01M 3/007 |
| 2018/0372579 | A1* | 12/2018 | Decker ............... | G01M 3/3236 |
| 2019/0078976 | A1* | 3/2019 | Nelson ............... | G01M 15/042 |

FOREIGN PATENT DOCUMENTS

| | | | |
|---|---|---|---|
| DE | 4442174 | A1 | 5/1996 |
| DE | 10247167 | A1 | 4/2004 |
| DE | 102014219481 | A1 | 3/2016 |
| DE | 19523430 | A1 | 10/2022 |

* cited by examiner

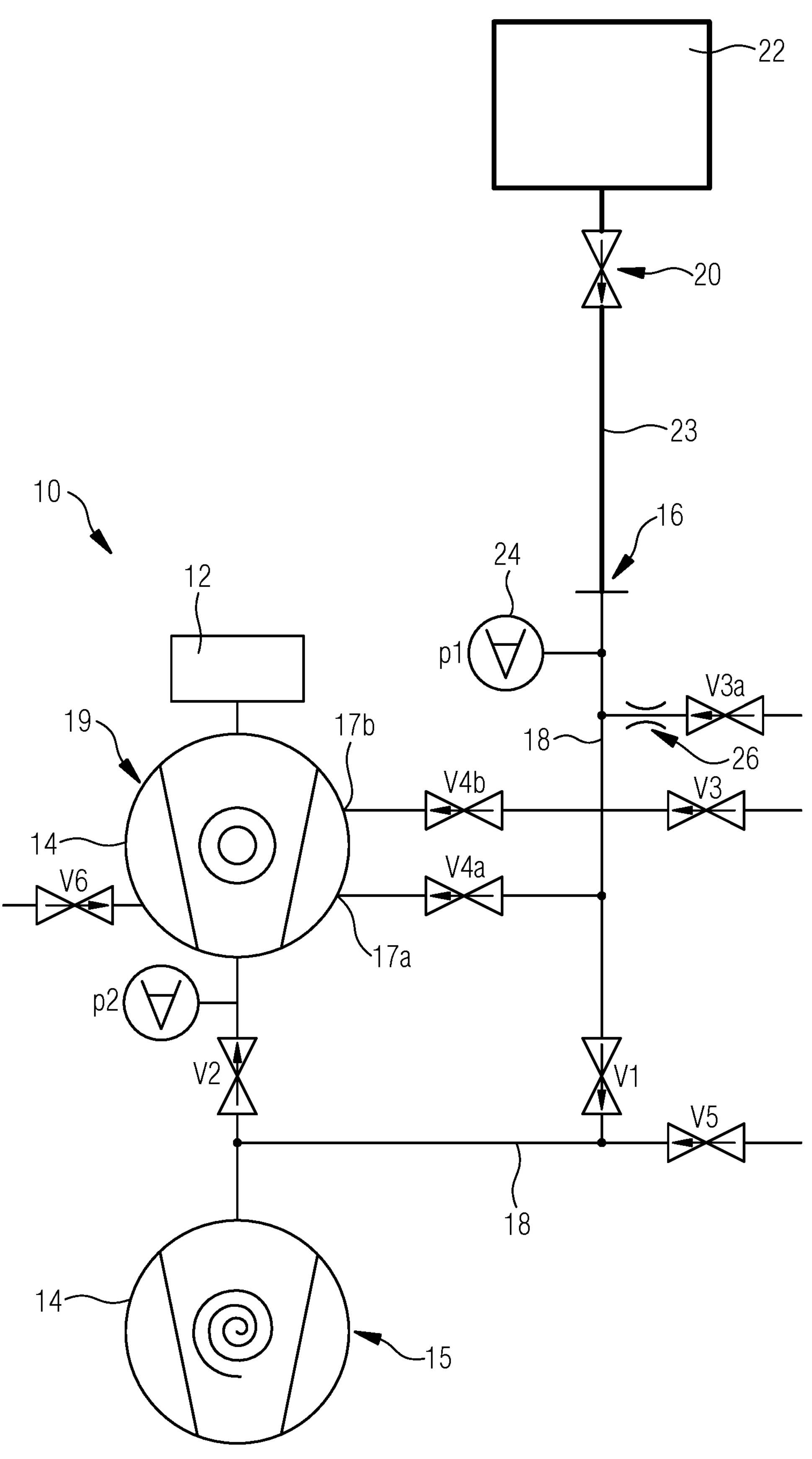
22
20
23
10
16
24
12
p1
V3a
19
17b
18
26
V4b
V3
14
V4a
V6
17a
p2
V2
V1
V5
18
14
15

LEAK DETECTORS

The invention relates to a leak detection device and a method for venting a leak detection device.

Leak detection devices foe testing the gas tightness of a test object typically comprise a gas detector which may be a mass spectrometer, and a vacuum pump which, in case of a mass spectrometer, is a two-stage turbomolecular pump whose high vacuum pump stage evacuates the mass spectrometer and whose prevacuum pump stage evacuates the port for the test object. The port is connected to the gas detector and the vacuum pump via a connection line.

A test object is connected to the port and is evacuated using the vacuum pump. In the case of a leaky test object, gas flows through the leak into the test object from outside the test object and is supplied from there to the gas detector and is detected by the same. For venting such leak detection devices, the connection line between the vacuum pump, the das detector and the port for the test object is provided with a venting valve. Venting should be performed, for example, before the test object is detached from the port. However, it may be disadvantageous to also vent the test object, since this changes the pressure in the test object and the interior of the test object can be contaminated. Therefore, it should be avoided, if possible, to vent the leak detection device if the test object is still connected to the port in a gas-conducting manner.

It is an object of the invention to provide a leak detection device that allows for a secure and improved venting. Further, a corresponding method for venting a leak detection device shall be provided.

The leak detection device of the invention is defined by the features of claim 1. The method of the invention is defined by the features of claim 5.

The port or the connection line connecting the port with the gas detector and the vacuum pump is provided with a pressure measurement device configured to measure the pressure at the port. The connection line is further provided with a selectively controllable venting valve. The pressure measurement device measures the pressure p(t1) at the port and thereafter, the venting valve is temporarily opened in a pulse-like manner and then closed again, so that during the duration of the short pulse, gas flows from the surrounding atmosphere into the connection line and into the port. Here, the connection line and the port may be referred to as the inlet region of the leak detection device. The inflow of air or gas into the inlet region occurs via the venting valve for a short period of a few 100 milliseconds, preferably less than one second or less than 500 milliseconds. After the gas has been let in, the pressure p(t2) is measured at the port. Measuring the pressure p(t2) is preferably performed after a few 100 milliseconds after venting, preferably within a period between 50 milliseconds and a second and preferably after about 200 milliseconds after venting. Based on the measured pressures p(t1), p(t2), the closing state of an isolation valve connected to the port is determined automatically. The isolation valve is provided in a gas-conducting connection between the port and the test object.

If the isolation valve is closed, other pressures p(t1), p(t2) prevail at the port than in the case of an open isolation valve, since the volume connected to the port is larger than in the case of a closed isolation valve. This can be determined automatically based on the pressures p(t1), p(t2).

Preferably, an automatic venting of the leak detection device via a venting valve is performed only when it is determined that the isolation valve is closed. Correspondingly, an automatic venting of the leak detection device can be prevented if it is determined that the isolation valve is closed.

For a detection of the closing state, the difference from the measured values of the two pressures p(t1), p(t2) can be calculated advantageously. If the difference is greater than or equal to a predetermined or adjustable threshold value, the isolation valve is considered closed and venting the leak detection device can be performed. If the difference is less than the threshold value, the venting valve is considered open and venting the leak detection device is prevented or inhibited preferably automatically.

As an alternative or in addition, an assessment of the closing state of the isolation valve can be performed based on the path of the measuring signal of the pressure sensor during a period, for example by obtaining the gradient and/or the curvature of the signal path. As an alternative or in addition, an assessment of the closing state of the isolation valve can be performed based on a mathematic derivation of the path of the measuring signal of the pressure sensor during a period, for example by obtaining the first and/or a further derivative of the signal path. Here, the derivative can be compared with a threshold value.

The method of the invention is advantageously performed after a user of the leak detection device initiated a venting of the leak detection device, for example by operating a corresponding key or an operating element, so as to allow venting only if the isolation valve is closed.

An embodiment of the invention will be explained in detail hereunder with reference to the FIGURE. The FIGURE shows a schematic illustration of the embodiment.

The leak detection device 10 comprises a gas detector 12 in the form of a mass spectrometer, and a two-stage vacuum pump 14 connected to the das detector 12 to evacuate the gas detector 12. A port 16 is connected to the vacuum pump 14 and the gas detector 12 in a gas-conducting manner via a connection line 18, the first pump stage forming a prevacuum stage and being provided to evacuate, via the connection line 18, the port 16 and a test object 22 connected to the port 16, whereas an intermediate gas inlet of the second pump stage in the form of a high vacuum pump is also connected to the port 16 via the connection line 18 so as to let gas from the test object 22 into the mass spectrometer in counterflow.

The connection line 18 is connected to a venting valve V3 for venting the leak detection device 10. The venting valve V3 is open towards atmosphere. The invention provides that the valve V3 is and can be opened for a complete venting of the leak detection device only if it is detected that the isolation valve 20 connected to the port 16, which is provided in the gas-conducting connection connecting the port 16 with the test object 22, is closed so as to prevent a venting of the test object 22. Advantageously, the end of the first venting valve V3 and/or of the second venting valve V3*a* open towards atmosphere is provided with a fine-pored filter not illustrated in the FIGURE, so as to reduce an introduction of particles from the atmosphere into the leak detection device 10 and into the test object 22.

For this purpose, a control and evaluation device not illustrated in the FIGURE is provided which is connected electronically with the pressure measurement device 24 which connected to the gas-conducting connection and the port 16, and the first venting valve V3 and a second venting valve V3*a* also connected to the connection line 18 and the port 16 via a throttle 26. After a user of the leak detection device 10 has generated an electronic instruction to open the first venting valve V3, for example by operating a corresponding key or operating a control panel of the leak detection device 10, first, the pressure p(t1) at the port 16 is measured with the pressure measurement device 24. Here, all valves to the pump ports are in a closed state or are closed beforehand. Thereafter, the second venting valve V3*a* is automatically opened temporarily for a period of a few 100 milliseconds and is then closed again, whereas the first venting valve V3 still remains closed to thereby supply a short gas pulse to the port 16. After approximately 200 milliseconds after the closing of the second venting valve V3*a*, the pressure p(t2) at the port 16 is measured by the pressure measuring device 24.

Using the evaluation device, the difference from the pressure measurement values of the two pressures p(t1), p(t2) is then calculated and the calculated difference p(t2)−p(t1) is compared with a predetermined threshold value. The threshold value may be predetermined and/or preselected by an operator. The threshold value is calculated from the expected pressure increase. The expected pressure increase is derived from the conductance or the gas flow Q through the throttle 26, the volume V of the connection line 18 in the segment between the closed valves 20 and V1 and the opening duration t of the valve V3*a*. The expected pressure increase is calculated as follows:

$$\Delta p = \frac{Q \cdot t}{V}$$

The threshold value is preferably half the expected pressure increase, i.e. at a gas flow Q=1 mbar·l/s and a volume of 1 ltr for a valve opening duration of t=100 ms, approximately 0.05 mbar.

If the difference exceeds the threshold or is equal thereto, the isolation valve 20 is automatically considered to be closed. A large difference above the threshold value indicates a low volume beyond the port 16. If, on the other hand, the difference is below the threshold value, this indicates a large volume beyond the port 16 and the evaluation device then automatically considers the isolation valve 20 to be open. In this case, opening the first venting valve V3 is prevented or a user is asked, whether the first venting valve V3 shall actually be opened, although the isolation valve 20 is open. In the case of an isolation valve 20 being detected as closed, the first venting valve V3 is opened automatically.

In another embodiment not illustrated in the FIGURE, venting the port 16 is performed between the measurement of the two pressures p(t1), p(t2) using the same first venting valve V3 as in venting the leak detection device 10. A separate second venting valve V3*a* is not required in this case.

Thus, the invention prevents an inadvertent venting of the leak detection device 10 while the isolation valve 20 is open and the test object 22 is connected, so as to prevent a venting of the test object 22. To this end, after measuring the pressure p(t1) at the port 16, a test venting of the port 16 is performed, as it were, before the second pressure p(t2) is measured at the port 16. Based on the test venting and the associated pressure increase at the port 16, the closing state of the isolation valve 20 is determined, so as to allow a venting of the leak detection device 10 only if the isolation valve 20 is closed.

The invention claimed is:

1. A leak detection device comprising a gas detector, a vacuum pump, a port for a test object and a gas conducting path connecting the port to the gas detector and the vacuum pump, wherein the port comprises a controllable isolation valve for the selective opening or closing of the port, and a pressure measurement device for measuring the pressure at the port is provided and the connection line comprises a controllable venting valve for selectively allowing gas from the surrounding atmosphere to flow to the port in a pulse, the leak detection device being configured to measure the pressure p(t1) at the port at a first time t1 before the opening of the venting valve, thereafter to open and close the venting valve in a pulse and to measure the pressure p(t2) at the port at least at a time t2>t1 after the closing of the venting valve and to determine, whether the isolation valve is open or closed based on the measured pressures p(t1), p(t2).

2. The leak detection device according to claim 1, wherein the leak detection device comprises an evaluation unit which detects the measuring values of the pressure p(t1), p(t2), controls the venting valve, and automatically performs the determination of the closing state of the isolation valve.

3. The leak detection device according to claim 1, wherein the venting valve is connected to the connection line via a throttle.

4. The leak detection device according to claim 1, wherein the gas detector is a mass spectrometer and the vacuum pump is a high vacuum pump with at least two pump stages.

5. The leak detection device according to claim 1, wherein the first venting valve and/or a second venting valve comprise an opening towards atmosphere, which is closed by a pored filter that reduces an introduction of particles from the atmosphere into the leak detection device.

6. A method for venting a leak detection device comprising a gas detector, a vacuum pump, a port for a test object and a connection line connecting the port to the gas detector and the vacuum pump, characterized by the following steps:

measuring the pressure p(t1) at the port at a first time t1, supplying gas in a pulse from the surrounding atmosphere or from a gas supply to the port, measuring the pressure p(t2) at least at one second time t2>t1 after the supply of gas to the port, determining the closing state of an isolation valve connected to the port, which is provided for connection between the port and the test object, based on the measuring values p(t1), p(t2) of the measured pressures at the port.

7. The method according to claim 6, wherein for determining the closing state of the isolation valve, the difference from the measuring value of the pressure p(t1) and the measuring value of the pressure p(t2) is calculated and the isolation valve is considered to be closed, if the difference is above a threshold value, and wherein the isolation valve is considered to be open, if the difference is below the threshold value.

8. The method according to claim 7, wherein the port is vented automatically, if the difference is above the threshold value and/or the isolation valve is considered to be closed.

9. The method according to claim 7, wherein the port is not vented, if the difference is below the threshold value and/or the isolation valve is considered to be open.

10. The method according to claim 6, wherein for determining the closing state of the isolation valve, a graph illustrating measurement values of the measuring signal comprising the pressure measurement values p during a period is obtained and evaluated.

11. The method according to claim 6, wherein for determining the closing state of the isolation valve, a mathematical derivation of a graph illustrating measurement values of the measuring signal comprising the pressure measurement values p during a period is obtained and evaluated.

12. The method according to claim 6, wherein supplying gas to the port prior to measuring the pressure p(t2) and after measuring the pressure p(t1) is performed for a short period of less than one second after supplying the gas in the pulse to the port.

13. The method according to claim 12, wherein measuring the pressure p(t2) is performed within a period of at least 50 milliseconds and less than one second after supplying the gas in the pulse to the port.

14. The device or the method according to claim 6, wherein, if an isolation valve is detected to be open, venting the leak detection device is performed using another valve than the one used in supplying gas to the port between the measurements of the two pressures p(t1), p(t2) at the port.

* * * * *